June 29, 1948.  R. R. ROBERTSON  2,444,372
EXPANSION JOINT
Filed July 23, 1945
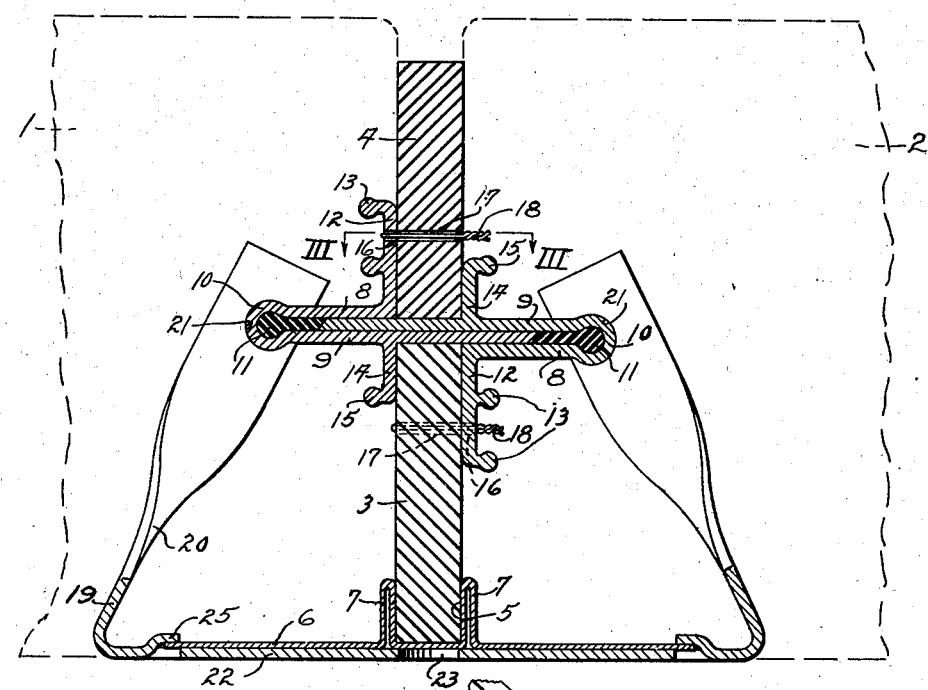
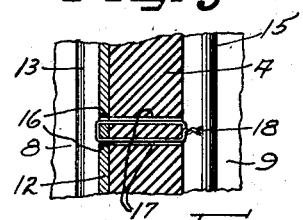
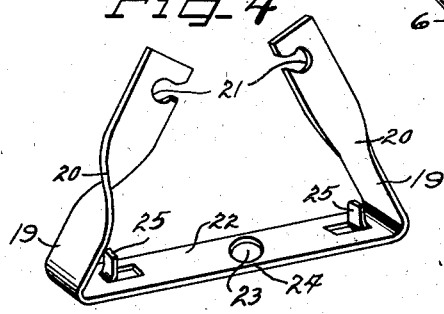
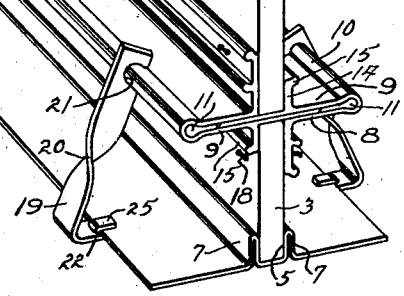
Inventor
Robert R. Robertson Patented June 29, 1948

2,444,372

UNITED STATES PATENT OFFICE 2,444,372

EXPANSION JOINT

Robert R. Robertson, Chicago, Ill.

Application July 23, 1945, Serial No. 606,648

8 Claims. (Cl. 94—18)

The present invention pertains to transverse road joints and more particularly to an expansion joint adapted to be furnished in an assembled unit wherein the major members such as the base, the load transmitting members and the filler board, are all of a length equal to the length of the joint, with said load transmission members slidably interfitting one another from opposite sides of the joint and passing between upper and lower sections of the filler board. The load transmission members are wired to the filler board sections and are additionally supported in position above the base member by improved and simplified forms of saddle brackets extending transversely beneath the base member and including notched twisted arms fitting over bight portions of the load transmission members to assist in bracing the same in place prior to the embedding of the assembled expansion joint unit in concrete.

An object of the invention is the provision of an improved type of concrete road expansion joint mechanism which is designed and constructed with improvements for increasing the adaptability and efficiency thereof.

It is also an object of this invention to provide an improved expansion joint unit wherein the load transmission members are disposed between filler board sections and are held in position by improved bracket members disposed beneath the joint base plate and each including upwardly projecting twisted supporting arms.

A further object of the invention is to provide a road expansion joint forming assembly including improved supporting brackets disposed transversely beneath the base plate member, said brackets arranged in spaced relationship for the purpose of engaging and holding interfitting load transmission members in co-operating relationship above and out of contact with the base member.

It is furthermore an object of this invention to provide an improved road expansion joint assembly including slidably interfitting load transmission units which are supported above the base member of the assembly with said units each being provided with improved spaced parallel anchoring ribs.

It is furthermore an object of this invention to provide an improved road expansion joint assembly including interfitting load transmission members disposed above the base member of the assembly and being formed with flanges adapted to be wired to the filler board members of the assembly, said flanges being formed with one or more anchoring ribs or beads.

A feature of the invention is the provision of a road expansion joint assembly wherein the load transmitting members are supported in position by means of a plurality of spaced bracket members, each of which includes notched twisted arms integrally connected by a transverse connecting member for disposition beneath the base member, said connecting member having spaced gripping means struck therefrom and also being formed with weakened portions whereby the connecting member may be more readily collapsed with the compression of the joint due to road slab expansion.

Still another object of the invention, is the provision of a road expansion joint assembly, wherein the novel shaping and positioning of improved supporting brackets for the load transmission units of the assembly permit a higher efficiency to be reached in the operation of the joint assembly when the road slabs are moved due to temperature changes and the like.

Still another object of the invention is to provide a road expansion joint assembly wherein load transmission supporting units are mounted with supporting portions thereof positioned to project beneath adjacent road slabs and including collapsible means for increasing the efficiency of the assembly.

It is an important object of this invention to provide an improved and simplified form of road expansion joint assembly, the various members of which may be readily assembled, and are more efficient in operation, said assembly adapted to be easily placed in position for embedding in concrete, insuring positive action and providing a general improvement in the road construction art.

For the attainment of the foregoing features, objects and advantages, the invention preferably consists in the details of construction and the arrangement and combination of parts to be hereinafter more fully described and explained, and illustrated in the accompanying drawings.

On the drawings:

Figure 1 is a fragmentary isometric view of the road expansion joint assembly embodying the principles of this invention and including improved parts arranged in interfitting assembled relationship whereby the assembly may be readily placed in position as a unit on a road subgrade and embedded in concrete ready for use;

Figure 2 is an enlarged vertical transverse sectional view taken through the expansion joint assembly, showing the same supported on a road subgrade and embedded in concrete road slabs illustrated in dotted lines;

Figure 3 is a transverse fragmentary sectional detail view taken on line III—III of Figure 2 to illustrate the wire ties; and Figure 4 is an isometric view of one of the improved supporting brackets and illustrating the details of the connecting base strip adaptable for positioning on the road subgrade beneath the assembly base member, said figure also illustrating the detail construction of the notched twisted supporting arms for engaging and holding the load transmission members of the assembly in position.

As shown in the drawings:

The present invention is directed to a road joint forming mechanism and more particularly to an assembly for the forming of an expansion joint for separating the concrete slabs of a road or other concrete constructing work requiring the use of expansion joints. The invention also involves the use of a novelly constructed load transmission unit wherein the interfitting members are constructed with a plurality of spaced anchoring means and wherein said interfitting members are held supported in position by improved bracket members including supporting arm pieces adapted for embedding in opposite road slabs, said bracket members each including a collapsible connecting member extending across the joint and beneath the oppositely positioned road slabs which embed the joint assembly.

The improved expansion joint forming assembly is adapted to be set up as a unit on a road subgrade, transversely of the road bed, to permit the assembly to be embedded between concrete road slabs 1 and 2 illustrated in Figure 2.

The improved expansion joint assembly includes a plurality of parts which are adapted to be assembled where constructed and then shipped as units to location, to permit the joint assemblies to be placed transversely on a road subgrade to extend from the road center joint to the shoulder of the road. The assemblies are placed in proper spaced relationship with respect to one another to permit pouring of the concrete for embedding the assemblies. If preferred or when occasion demands, the various parts of the joint assemblies may be shipped to location and there readily assembled.

The improved road expansion joint assembly of this invention comprises a preformed compressible bottom filler or core board 3 and a compressible upper filler or core board 4 constructed of asphalt, sponge rubber, cork or any other suitable compressible material. The lower or bottom filler board 3 is supported in position by inserting the lower longitudinal margin thereof frictionally into a channel or groove 5 provided in a holder which is integrally formed centrally and longitudinally of a base plate 6. The channel-shaped holder is formed by folding or bending portions of the base plate 6 on itself to provide two upwardly projecting spaced parallel looped flanges or ribs 7. The upper filler board section 4 is positioned in the plane of the lower filler board section 3 and is separated therefrom by improved load transmission units.

The load transmission unit, as clearly illustrated in Figure 2, is positioned above the base plate 6 and between the upper and lower filler board sections 3 and 4 out of direct supporting contact with the base plate 6. The load transmission unit comprises two substantially identical slidably interfitting and reversed sections, each preferably constructed of a cast lightweight metal such as an aluminum alloy. Each load transmission section comprises a narrow plate 8 and a wide plate 9 substantially parallel thereto. The two plates 8 and 9 of each section are integrally connected by a bight portion in the form of an anchoring sleeve 10, which is filled with a plastic filler 11 such as asphalt or the like. Formed at right angles to one margin of the narrow plate 8 is a wide flange 12 which is formed with two integral parallel anchoring ribs or beads 13 which project outwardly over and parallel to the plate 8. Integrally formed at substantially right angles to the wide plate 9 is a narrow flange 14 having integrally formed thereon an anchoring rib or bead 15 which projects outwardly and substantially parallel to the plate 9 and to the anchoring ribs 13.

The two load transmission sections telescope or slidably interfit one another with the wide plate 9 of one section projecting between the upper and lower filler boards 4 and 3 to slidably project between the plates 8 and 9 of the other load transmission section and seat against the plastic filler 11 as clearly illustrated in Figure 2. Each of the wide plates 9 of the load transmission section permit it to project into the opposite section until the flanges 12 and 14 of the sections contact the side surfaces of the respective filler board sections 3 and 4.

For the purpose of holding the interfitting reversed load transmission sections supported in position between the filler board sections, the wide flange 12 of each section is provided with a plurality of spaced groups of openings 16 which register with spaced parallel openings 17 in the filler board sections 3 and 4. Engaged through the registering openings 16 and 17 are tie wires 18, the projecting ends of which are twisted together to tightly hold the wide flanges 12 of the respective load transmission sections tightly clamped against the sides of the filler board sections 3 and 4.

To assist in holding the filler board sections and the load transmission units supported in position with the filler board section 3 inserted between the looped flanges 7 of the base plate 6, the joint assembly includes a plurality of spaced brace units. Each of the brace units is of novel construction and is formed out of a strip of metal, the end portions of which are bent upwardly and inwardly toward one another to provide brace arms 19. Each of the brace arms 19 is twisted at 20 intermediate the ends thereof to position the upper free ends of the arms at substantially right angles to the lower base portions of the arms as clearly illustrated in Figure 4. The upper end of each of the brace arms 19 is provided with a notch 21. The two arms 19 have the lower ends thereof integrally connected with a base connecting strip 22 provided at the middle portion thereof with an opening 23 leaving narrow weakened connecting links 24. Struck upwardly from the end portions of the connecting strip 22 are clamping or grip lugs 25. Normally the gripping lugs 25 project upwardly from the connecting strip 22 as shown in Figure 4 to permit the individual brace units to be slidably engaged transversely beneath the base plate 6 of the assembly while the notches 21 of the upwardly directed brace arms 19 slidably engage over the anchoring sleeves 10 of the load transmission section. The brace units are slid along the bottom of the base plate 6 until they are spaced a predetermined selected distance apart similar to the arrangement shown in Figure 1, after which the gripping lugs 25 are bent inwardly and downwardly to grip around the longitudinal margins of the base plate 6 to hold the brace units clamped in position to permit the brace arms of said units to act as braces for the assembled load transmission sections and the filler boards, as shown in Figure 1.

Each load transmission unit formed of two interfitting sections, may be cast out of any tough strong lightweight material such as aluminum alloy. Said load transmission sections are equal in length to the length of the upper and lower filler boards and to the length of the base section of the assembly. The brace units are so formed that the brace arms 19 thereof may be moved inwardly toward one another or outwardly away from one another with the expansion and contraction of the concrete road slabs 1 and 2 due to temperature changes or when said road slabs are moved with respect to one another due to other causes.

When an expansion joint forming assembly such as shown in Figure 1 is assembled at the factory and is shipped to location, it is only necessary to place the entire assembly transversely on the road subgrade so that the unit extends from the center joint of the road outwardly to the road shoulder. With the road joint assembly so placed on the subgrade, concrete is poured on opposite sides thereof to form the concrete road slabs 1 and 2 which embed the joint assembly so that the concrete will fill all the crevices and grooves around the various members forming the joint assembly. The concrete will also engage around the anchoring sleeves 10 and the anchoring ribs 13 and 15 so that the load transmission sections are securely anchored in position in the respective road slabs on opposite sides of the filler board sections.

With the road joint assembly embedded in position between the road slabs 1 and 2 as illustrated in Figure 2, expansion of the road slabs 1 and 2 will cause the same to move inwardly toward one another to compress the filler board sections 3 and 4 and cause the load transmission sections to slidably interfit with one another whereby the wide plates 9 of said sections will tend to compress the plastic compressible fillers 11. It will also be noted that with the expansion of the road slabs, the brace arms 19 of the respective brace units are permitted to move inwardly toward one another. With the expansion of the road slabs 1 and 2 the end portions of the connecting base strip 22 of each of the brace units are permitted to move inwardly toward one another, and due to the provision of the central opening 23 the weakened links 24 are adapted to be collapsed or buckled.

Attention is also called to the fact that the brace arms 19 of the brace units, not only serve as brace members for holding the load transmission sections braced in position above the base plate, but also act as anchoring means within the concrete road slabs.

With the various parts forming the expansion joint assembly being constructed as described, a substantially lightweight assembly is provided which can be readily handled after assembly since the interfitting load transmission sections of the assembly may be constructed of lightweight metal such as an aluminum alloy. It will also be noted that with the novel construction of the filler board sections and the load transmission sections, that the filler board sections may have the respective load transmission members placed adjacent to the sides thereof and wired thereto by means of the wires 18. This arrangement permits the two filler board assemblies each including a filler board section and a load transmission section wired thereto, together with a base unit, and the required number of brace units to be shipped in knocked-down form to location, where the parts may be readily assembled into the complete expansion joint forming unit shown in Figure 1, ready to be placed on a road subgrade for embedding in concrete.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A road joint former and load distributor comprising a base plate, filler board sections supported on the base plate, interfitting load transmission units separating the filler board sections and engaging against opposite sides thereof, and a plurality of brace units disposed in spaced relation transversely beneath the base plate, each of said brace units including a plurality of upwardly projecting twisted arms having notches therein for engaging portions of the load transmission units to assist in supporting and holding said load transmission units and the filler board sections braced in position on the base plate.

2. A road joint former and load distributor comprising a base plate, a filler board unit on the base plate and extending throughout the length thereof, holder means formed on the base plate for engaging the filler board unit to assist in holding the same in position, interfitting load transmission units projecting through the filler board unit and equal in length thereto, an anchoring sleeve forming a part of each of the load transmission units, a plurality of anchoring ribs integrally formed on each of the load transmission units and distributed on opposite sides of the anchoring sleeve, said anchoring sleeve and anchoring ribs being equal in length to the road joint former, and a plurality of spaced brace units engaged transversely beneath the base plate and each including upwardly projecting twisted arms formed to grip the load transmission units from opposite sides of the filler board unit to hold the filler board unit and the interfitting load transmission units braced in position on the base plate.

3. A road joint forming mechanism comprising a base plate, a filler board unit supported thereon, means on the base plate for engaging and holding the filler board unit in position, and a load transmission unit projecting through the filler board unit and spaced above the base plate, said load transmission unit comprising two slidably interfitting sections reversed with respect to one another, each of said load transmission sections comprising a pair of plates, an anchoring sleeve integrally connecting said plates, flanges integrally formed on the plates with one of said flanges being wider than the other, a cylindrical anchoring rib integrally formed on the narrower flange, and a pair of spaced cylindrical anchoring ribs integrally formed on the wider flange.

4. A road joint forming mechanism comprising a base plate, a filled board unit supported thereon, means on the base plate for engaging and holding the filler board unit in position, and a load transmission unit projecting through the filler board unit and spaced above the base plate, said load transmission unit comprising two slidably interfitting sections reversed with respect to one another, each of said load transmission sections comprising a pair of plates, an anchoring sleeve integrally connecting said plates, flanges integrally formed on the plates with one of said flanges being wider than the other, a rounded anchoring rib integrally formed on the narrower flange, a pair of spaced rounded anchoring ribs integrally formed on the wider flange, and a compressible filler in each of the anchoring sleeves and compressible by a plate of an adjacent interfitting load transmission section.

5. A load transmission expansion joint forming mechanism comprising filler members separated by load transmission devices, a base support for the filler members, brace units extending beneath the base support, means struck from the brace units for engaging the base support to hold the brace units clamped in position, each of said brace units including upwardly projecting arms having notches formed therein to engage over portions of the load transmitting devices to grip and hold said devices and the filler board sections braced in position on the base support to form an expansion joint assembly adapted to be handled as a unit to be placed transversely on a road subgrade for embedding in concrete.

6. In a joint forming assembly including a base for supporting filler boards which are separated by slidably interfitting load transmitting devices, a brace unit constructed of a strip of metal bent to form a base strip extending transversely beneath the base and upwardly projecting arms, said arms being twisted intermediate the ends thereof to position the upper ends of the arms at right angles to the lower ends of the arms, the upper ends of the arms having notches therein for gripping over portions of the load transmitting devices, said base strip also having an opening intermediate the ends thereof to provide a weakened section in the brace unit.

7. In an expansion joint forming assembly including a base on which filler board sections are supported and are separated by load transmitting devices, a brace unit engaged transversely beneath the base and projecting upwardly from opposite sides thereof to engage the load transmitting devices, said brace unit comprising a base strip, gripping members integrally formed thereon, brace arms integrally formed on the ends of the base strip and projecting upwardly toward one another, said brace arms having portions thereof intermediate the ends twisted to position the upper ends of the arms at right angles to the lower portions thereof, said arms having the upper portions thereof formed to grip over portions of the load transmission members to brace the same and the filler board sections in position on the base of the assembly, said gripping members adapted to be deflected to clamp over the base of the assembly to hold the brace unit in position.

8. In a road joint former and load distributor assembly including a base plate, filler board members supported on the base plate one above the other, interfitting load transmission units separating the filler board members, brace units projecting beneath the base plate and each of said base units comprising a base strip having an opening therein to form weakened connecting portions, gripper lugs struck upwardly from the base strip and clamped around opposite edges of the base plate, and notched twisted arms formed on the ends of said base strip and projecting upwardly to engage the load transmission units to hold the same and said filler board members braced in position on the base plate.

ROBERT R. ROBERTSON.

REFERENCES CITED

The following references are of record in the file of this patent:

UNITED STATES PATENTS

| Number | Name | Date |
|---|---|---|
| 1,675,313 | Awbrey | June 26, 1928 |
| 1,856,722 | Older | May 3, 1932 |
| 2,086,393 | Robertson | July 6, 1937 |
| 2,096,254 | McGrady, Jr. | Oct. 19, 1937 |
| 2,130,859 | Robertson | Sept. 20, 1938 |
| 2,166,220 | Older | July 18, 1939 |
| 2,215,653 | Robertson | Sept. 24, 1940 |
| 2,246,903 | Spears | June 24, 1941 |
| 2,256,930 | Willard | Sept. 23, 1941 |
| 2,278,023 | Robertson | Mar. 31, 1942 |
| 2,299,670 | Westcott | Oct. 20, 1942 |
| 2,325,472 | Brickman | July 27, 1943 |